R. FULLER.
STEERING MECHANISM FOR SELF PROPELLED VEHICLES.
APPLICATION FILED FEB. 6, 1908.

924,757.

Patented June 15, 1909.

4 SHEETS—SHEET 2.

WITNESSES:
Walter A. Greenburg
A. M. Dorr

INVENTOR
Rodolphus Fuller
BY
ATTORNEYS

R. FULLER.
STEERING MECHANISM FOR SELF PROPELLED VEHICLES.
APPLICATION FILED FEB. 6, 1908.
924,757.
Patented June 15, 1909.
4 SHEETS—SHEET 3.
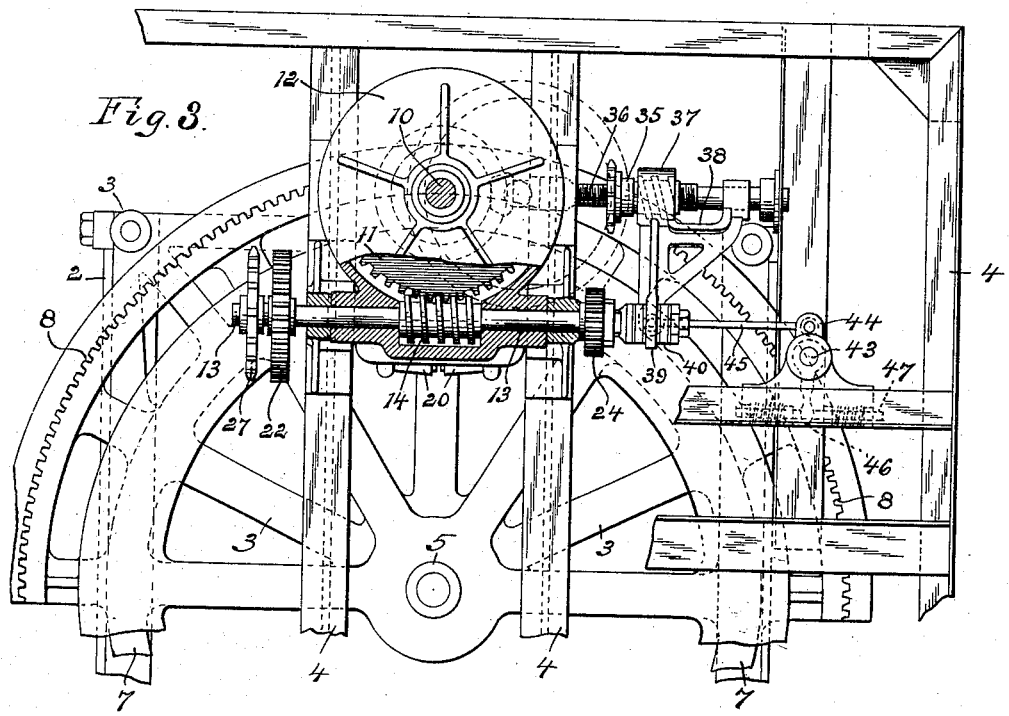
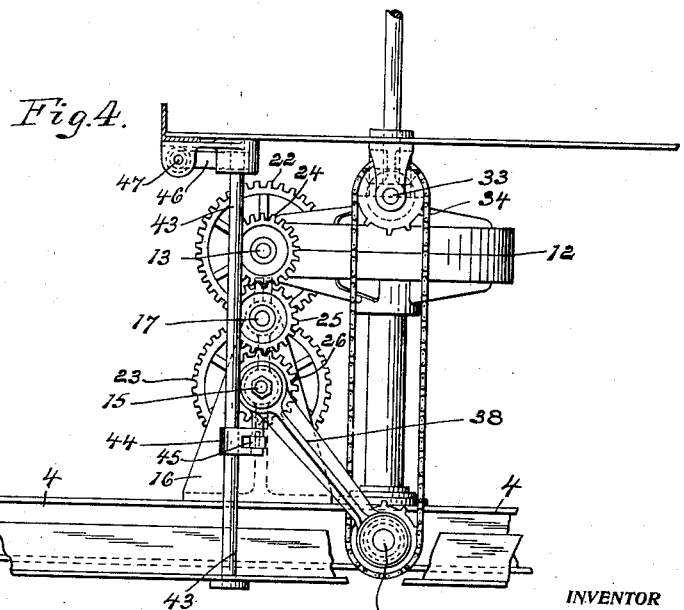
WITNESSES:
Walter A. Greenburg
A. M. Dow
INVENTOR
Rodolphus Fuller
BY
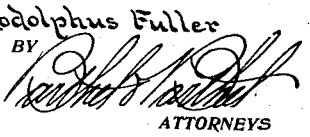
ATTORNEYS R. FULLER.
STEERING MECHANISM FOR SELF PROPELLED VEHICLES.
APPLICATION FILED FEB. 6, 1908.

924,757.

Patented June 15, 1909.
4 SHEETS—SHEET 4.

WITNESSES:
Walter A. Greenburg
A. M. Dorr

INVENTOR
Rodolphus Fuller
BY
ATTORNEYS

UNITED STATES PATENT OFFICE.

RODOLPHUS FULLER, OF DETROIT, MICHIGAN.

STEERING MECHANISM FOR SELF-PROPELLED VEHICLES.

No. 924,757.  Specification of Letters Patent.  Patented June 15, 1909.

Application filed February 6, 1908. Serial No. 414,605.

*To all whom it may concern:*

Be it known that I, RODOLPHUS FULLER, a citizen of the United States of America, residing at Detroit, in the county of Wayne and State of Michigan, have invented certain new and useful Improvements in Steering Mechanisms for Self-Propelled Vehicles, of which the following is a specification, reference being had therein to the accompanying drawings.

This invention relates to improvements in steering mechanisms for self-propelled vehicles, and more especially to devices of this character in which the power to turn the vehicle wheels laterally to change the course of the vehicle, is supplied by a motor, and in which a hand wheel is provided to control the application of the power to the steering mechanism.
The object of the invention is to provide means under the control of the hand wheel, for so controlling the transmission of power from the motor to the steering mechanism that when the hand wheel is turned, the vehicle wheels will be turned laterally in a corresponding ratio, and when said hand wheel is held from turning, the application of power will be discontinued and the vehicle wheels held against deflection.
A further object of the invention is to provide certain other new and useful features in the construction, arrangement and combination of parts, all as hereinafter more fully described reference being had to the accompanying drawings in which—

Figure 1:
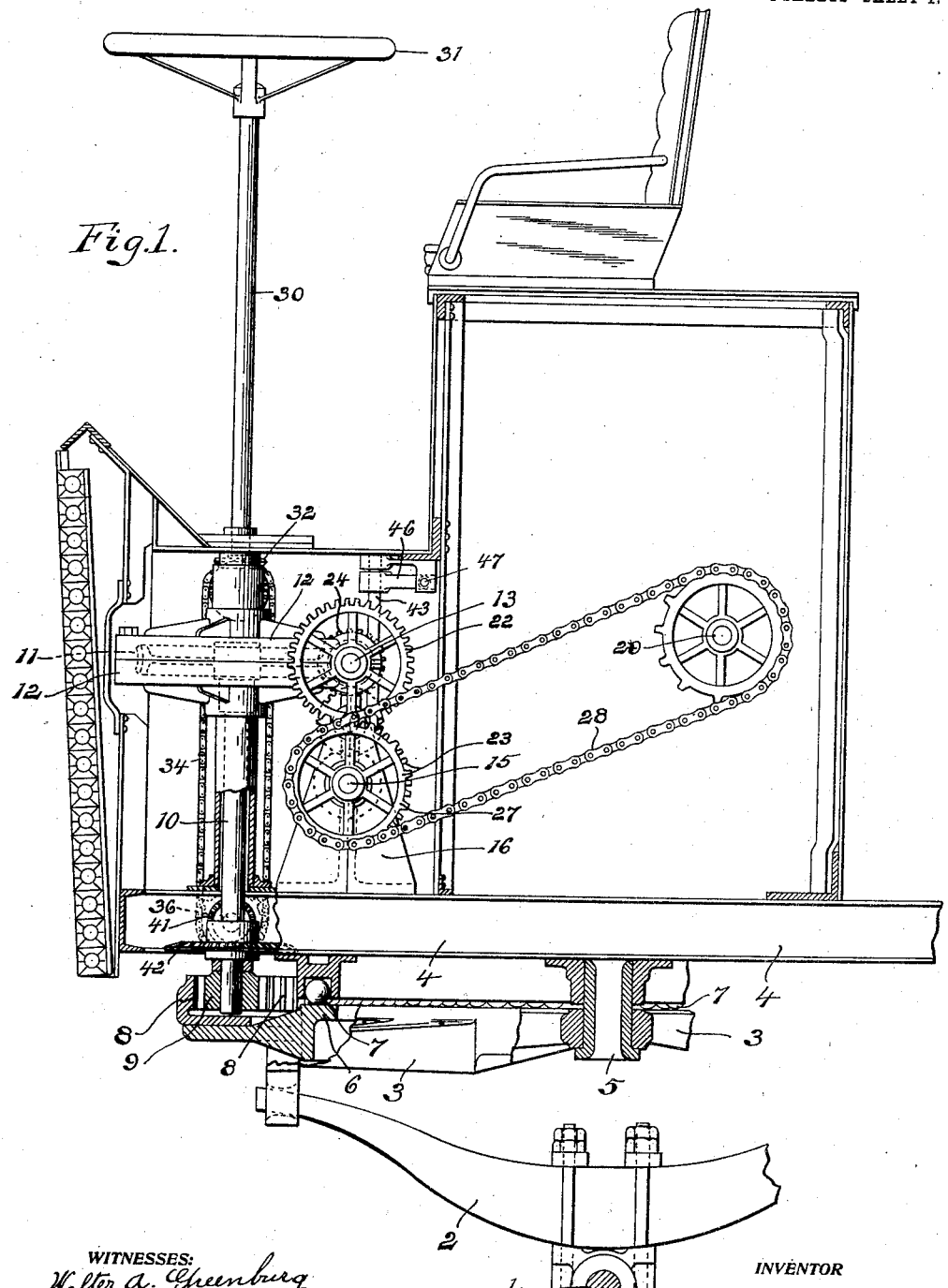
Figure 2:
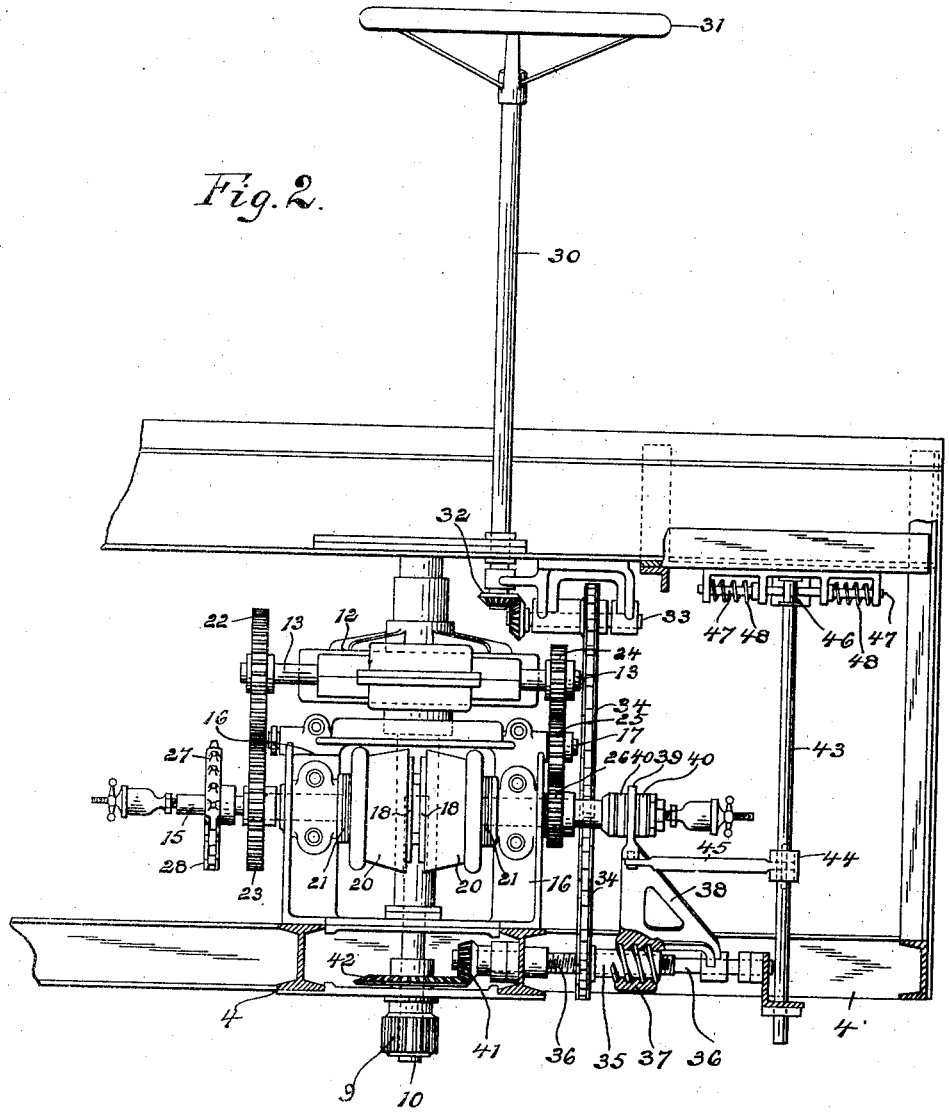
Figure 5:
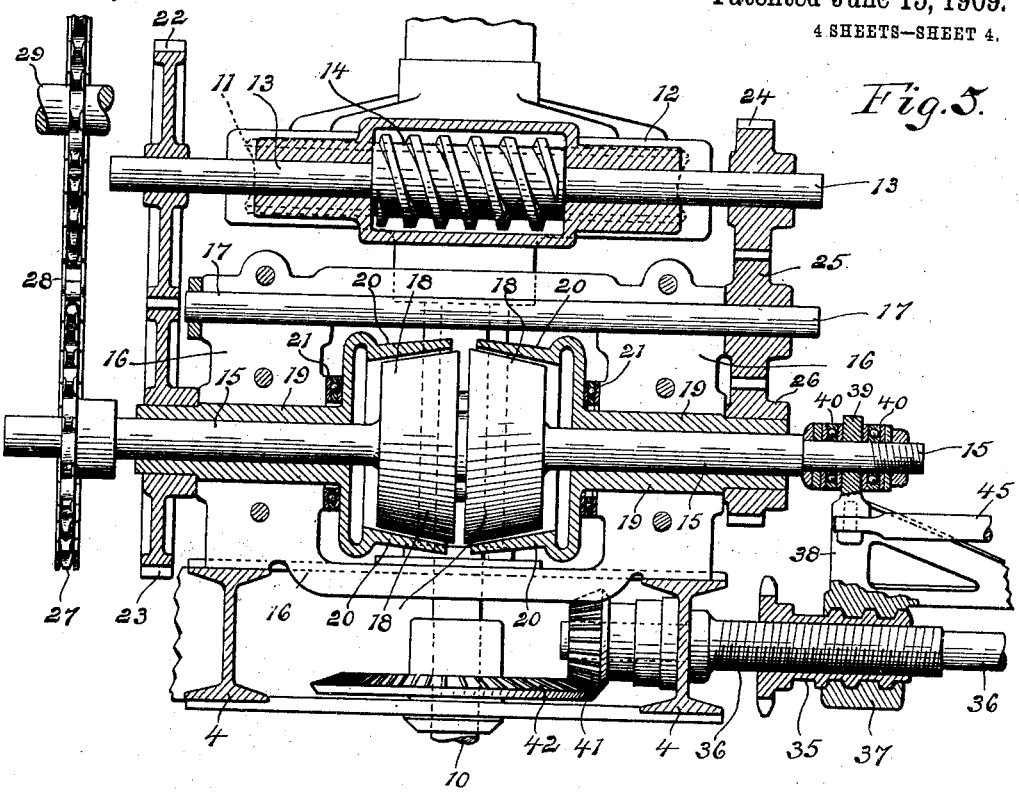

Figure 1 is a side elevation of a device embodying the invention with parts broken away to show the construction and showing the device as applied to a heavy motor truck having a centrally pivoted forward truck frame; Fig. 2 is a rear elevation of the same; Fig. 3 is a plan view with parts broken away to show the construction; Fig. 4 is an elevation of the side of the steering mechanism opposite to that shown in Fig. 1; and Fig. 5 is an enlarged vertical section through the friction clutch.

As shown in Fig. 1, 1 is the forward axle of a heavy motor vehicle or truck and 2 are springs secured thereto, which springs support a truck frame 3 pivotally attached to the body frame 4 by a king pin 5 in the axis of a circular track 6 on the truck frame, which track is engaged by a series of balls 7
carried by a ring secured to the body frame and forming a ball-bearing upon which the truck frame turns.

Secured to the forward side of the truck frame is a semi-circular rack or toothed segment 8 engaged by a pinion 9 on the lower end of a vertical shaft 10 to the upper end of which shaft is secured a large worm gear 11 inclosed within a casing 12 which forms a bearing for a transverse shaft 13 upon which is secured a worm 14 in mesh with the worm gear. Vertically below the shaft 13 is a shaft 15 extending parallel therewith and mounted in bearings on a suitable supporting frame 16, and mounted in bearings on the same frame, vertically between said shafts 13 and 15 and extending parallel with these is an intermediate shaft 17. On the shaft 15 are two oppositely inclined friction cones 18 and two tubular sleeves 19 on the shaft extend outward from said cones through the shaft bearings, the inner ends of said sleeves being formed with cups 20 to receive said cones. These cups are spaced apart a short distance so that when the shaft 15 which is longitudinally movable in said sleeves, is moved to mid-position, the cones will be out of contact with both cups and the shaft will run free. Thrust collars 21 are provided on the sleeves between the cups and the frame 16 to take the end thrust when the shaft is moved longitudinally to bring one of the cones into frictional contact with its cup. On one end of the worm shaft 13 is a gear 22 in mesh with a gear 23 on the outer end of one of the sleeves 19 and on the opposite end of said shaft is a gear 24 in mesh with a similar gear 25 on the intermediate shaft 17 which gear in turn engages a like gear 26 on the other sleeve 19 on the driving shaft 15.

A sprocket wheel 27 is secured on one end of the driving shaft 15 and a chain 28 engaging said sprocket transmits motion to the shaft from a similar sprocket secured upon a shaft 29 which may be the crank shaft of an engine or the motor which is adapted to run continuously to impart to the drive shaft a constant speed.

A vertical steering post 30 is provided with a hand wheel 31 at its upper end and at its lower end is mounted to turn in a suitable bearing and provided with a bevel gear 32 in mesh with a similar gear on the end of a short horizontal shaft 33 mounted in bearings on a suitable bracket and provided with a sprocket engaged by a sprocket chain 34 which transmits motion to a similar sprocket secured upon or formed integral with a sleeve 35. This sleeve is internally screw-threaded to engage a horizontally extending screw-threaded shaft 36 which passes therethrough, and the sleeve is provided on its exterior with a coarse screw-thread of greater pitch than the pitch of the thread on the shaft, to engage a suitable nut 37 formed integral with a bracket 38 having an apertured end 39 to receive one end of the shaft 15. Secured upon said shaft at each side of the apertured end is a thrust bearing ring 40 to take the thrust of the bracket when it is moved longitudinally of the screw shaft 36 to move the driving shaft and bring one of its cones into contact with one of the cups. The screw shaft 36 extends through its bearing on the body frame toward the vertical steering shaft 10 and is provided with a bevel pinion 41 to engage a bevel gear 42 on said steering shaft. To take up any lost motion which there may be in the nut 37 owing to wear, etc., a vertical rock-shaft 43 is mounted in suitable bearings on the body frame and provided with a laterally extending arm 44 connected by a rod 45 to the bracket 38. On the upper end of the rock-shaft is a second arm 46 with its free end between the opposed ends of two centering pins 47 mounted in suitable guides and having springs 48 sleeved thereon to normally hold said pins pressed firmly against the opposite sides of the arm 46 and exerting a pressure to hold said arm in mid-position. These springs thus resist the movement of the bracket 38 in either direction on its screw-shaft 36 or sleeve 35.

When in the position shown in the drawings, the parts are all at rest except the driving shaft 15 which is running free, it being in mid-position with its cones out of engagement with their cups, and the truck frame is held from turning on its king pin, by the pinion 9, the steering shaft 10 being locked by the worm 14. A turning of the hand wheel will, by reason of the difference in the pitch of the threads on the screw-shaft and sleeve, move the bracket 38 longitudinally and shift the driving shaft 15, bringing one of the cones into frictional engagement with its cup. Motion is then transmitted from the driving shaft through the cup and gears to the worm shaft, in one direction or the other according to which cup is engaged and through the worm and worm gear to the steering shaft, turning the pinion 9 which engages the rack on the truck and thus turning said truck on its king pin. As soon as the steering shaft 10 starts, motion is transmitted therefrom by the bevel gear 42 to the screw-shaft 36 and by reason of its screw-threaded engagement with the sleeve 35, said sleeve is moved longitudinally. The direction of motion of the steering shaft and the relation of the screw-thread on the shaft to that on the sleeve is such that the sleeve will be moved by the turning of the shaft, in a direction opposite to the direction in which the bracket is moved by the turning of the hand wheel and therefore if the hand wheel is turned to shift the bracket and throw the clutch, and is then held in that position, holding the sleeve from turning, the clutch will be at once thrown out by the turning of the screw-shaft which will shift the sleeve and bracket in an opposite direction. The clutch is continued in frictional contact after the starting of the steering shaft and turning of the truck, to turn said truck still further in the same direction, by continuing to turn the hand wheel, which turning will move the sleeve relative to the bracket and hold the bracket in the position to which it was first moved by the hand wheel. When the hand wheel is turned, the truck is thus turned in a corresponding ratio, and when said hand wheel is held from turning, the free running shaft 15 connected with the motor is at once automatically disconnected from the steering mechanism and the truck is held by the worm gearing in the position to which it has been turned, which position corresponds to the position in which the hand wheel is held. There is therefore the same fixed relation between the movements of the hand wheel and truck that there would be if the hand wheel was directly connected to the steering mechanism to operate the same and the danger that the turning of the truck will be out of proportion to that of the hand wheel, owing to the inertia of the parts, etc., is eliminated.

Having thus fully described my invention what I claim is:

1. In a steering mechanism for self-propelled vehicles, the combination of a steering member, a worm and gear to actuate said member, a motor, a hand wheel, means for transmitting motion from the motor to the worm and gear, and means actuated by the hand wheel for holding said transmitting means in operative position during the turning of said hand wheel.

2. In a steering mechanism for self-propelled vehicles, the combination of a steering member, a motor, means including a clutch for transmitting motion from the motor to said member, and means for automatically operating the clutch to stop the transmission of motion.

3. In a steering mechanism for self-propelled vehicles, the combination of a steering member, a motor, means including a clutch for transmitting motion, manually operated means to cause the clutch to transmit motion from said motor to said member, and means actuated by the movement of said member to discontinue the transmission of motion by said clutch.

4. In a steering mechanism for self-propelled vehicles, the combination of a steering member, a motor, means for transmitting motion from the motor to the steering member comprising a clutch, a hand wheel, means actuated by the hand wheel for moving said clutch into operative position, and means actuated by the steering member to throw the clutch out of operative position.

5. In a steering mechanism for self-propelled vehicles, the combination of a steering member, a motor, means for transmitting motion from said motor comprising a clutch adapted to transmit motion in either direction to said steering member, a member for actuating the clutch, a hand wheel, means actuated by the hand wheel for moving the clutch actuating member, and means actuated by said steering member to move the clutch actuating member in a direction opposite to that in which it was moved by the hand wheel.

6. In a steering mechanism for self-propelled vehicles, the combination of a steering shaft, a worm and gear to actuate said shaft, a continuously rotating driving shaft, a clutch for transmitting motion in either direction from said driving shaft to said worm and gear, a screw-threaded member adapted to be manually turned to move the clutch into an operative position, and a screw-threaded member actuated by the steering shaft to move the clutch out of an operative position.

7. In a steering mechanism for self-propelled vehicles, the combination of a steering member, a worm and gear to actuate said member, a clutch to transmit motion to the worm and gear consisting of oppositely inclined cones and cups to receive the cones, means for moving either of the cones into engagement with its cup and means actuated by the steering member for moving said clutch actuating means.

8. In a steering mechanism for self-propelled vehicles, the combination of a steering shaft, a longitudinally movable driving shaft, a motor to actuate the driving shaft, cones fixed on the driving shaft, opposed cups on the driving shaft to receive the cones, means for transmitting motion from the cups to the steering shaft, a screw actuated member to move the driving shaft longitudinally, and a screw shaft actuated by the steering shaft to move the driving shaft.

9. In a steering mechanism for self-propelled vehicles, the combination of a steering shaft, a motor, means for transmitting motion from the motor to the steering shaft comprising a clutch, a screw-threaded shaft actuated by the steering shaft, an internally screw-threaded sleeve on said screw-threaded shaft and provided with an external screw-thread, a member to actuate the clutch provided with a nut to engage the sleeve, a hand wheel, and means for transmitting motion from the hand wheel to said sleeve.

10. In a steering mechanism for self-propelled vehicles, the combination with a centrally pivoted truck and a rack-bar on said truck, of a steering shaft, a pinion on said shaft to engage the rack, a worm-gear on the shaft, a worm engaging said gear, a driving shaft, means comprising a clutch to transmit motion from said driving shaft to the worm, a member to move the clutch, a hand wheel, means for transmitting motion from said hand wheel to move said member, and means actuated by the steering shaft to move said member.

11. In a steering mechanism for self-propelled vehicles, the combination with a steering member, of a longitudinally movable drive shaft, oppositely inclined cones on said shaft, sleeves on said shaft having cups to receive the cones, means for transmitting motion from each of said sleeves to the steering member, a bracket engaging the shaft to move the same longitudinally and bring either of the cones into engagement with its cup, a screw-threaded shaft actuated by the movement of the steering member, a sleeve on the screw-threaded shaft provided with an external screw-thread to engage a nut on said bracket, a hand wheel, and means for transmitting motion from the hand wheel to said sleeve.

12. In a steering mechanism for self-propelled vehicles, the combination with a centrally pivoted truck and a rack-bar on said truck, of a steering shaft, a pinion on said shaft engaging the rack, a worm-gear on the shaft, a worm engaging the gear, a longitudinally movable driving shaft, oppositely inclined cones on said shaft, sleeves on said shaft having cups to engage the cones, gears to transmit motion from one sleeve to turn the worm in one direction, and gears to transmit motion from the other sleeve to turn the worm in the other direction, a screw-threaded shaft, gears to transmit motion from the steering shaft to said shaft, an internally screw-threaded sleeve on said screw-threaded shaft having an external screw-thread of greater pitch than the pitch of the thread on the shaft, a bracket having a nut engaging the sleeve and attached to the driving shaft to move the same longitudinally, a hand wheel, and means for transmitting motion from the hand wheel to said sleeve.

In testimony whereof I affix my signature in presence of two witnesses.

RODOLPHUS FULLER.

Witnesses:
OTTO F. BARTHEL,
C. R. STICKNEY.